United States Patent [19]

Bowers

[11] Patent Number: 5,296,947
[45] Date of Patent: Mar. 22, 1994

[54] SYSTEM FOR SOFTPROOFING A COLOR REPRODUCTION

[75] Inventor: Harry Bowers, New York, N.Y.

[73] Assignee: Cactus, Santa Fe Springs, Calif.

[21] Appl. No.: 957,396

[22] Filed: Oct. 6, 1992

[51] Int. Cl.$^5$ .............................................. H04N 1/46
[52] U.S. Cl. .................................. 358/527; 358/504;
358/523; 358/518; 358/534
[58] Field of Search ............... 358/527, 504, 523, 518,
358/540, 534, 530, 500; 340/701, 703

[56] References Cited

U.S. PATENT DOCUMENTS

| | | | |
|---|---|---|---|
| 3,972,066 | 7/1976 | Seki et al. | 358/527 |
| 4,500,919 | 2/1985 | Schreiber | 358/518 |
| 4,691,229 | 9/1987 | Colditz et al. | 358/527 |
| 4,769,696 | 9/1988 | Utsuda et al. | 358/80 |
| 4,958,220 | 9/1990 | Alessi et al. | 358/76 |

Primary Examiner—Edward L. Coles, Sr.
Assistant Examiner—Fan Lee
Attorney, Agent, or Firm—Majestic, Parsons, Siebert & Hsue

[57] ABSTRACT

Cyan, magenta, yellow and black ink are each used to print a color patch to obtain four color patches. Two of each pair of the three colorants cyan, magenta and yellow are used to print a red, a green and a blue patch. These seven color patches together with a patch formed by the printing medium with no colorant form eight color patches. A color monitor is adjusted until its screen color matches one of the eight color patches and the appearance values of the monitor are noted. This is repeated for each of the eight patches in order to compile a lookup table for the colors in each of the eight color patches. For softproofing, each square in a color grid pattern printed by the printer will contain portions, each of which has a color identical to one of the eight color patches. Using the lookup table, the values of the appearance signals corresponding to the colors of these portions in the square area are obtained for displaying a color patch on the color monitor of the same color. In this manner, the color image displayed by the monitor will closely resemble the printing result using actual inks.

19 Claims, 2 Drawing Sheets

SYSTEM FOR SOFTPROOFING A COLOR REPRODUCTION

BACKGROUND OF THE INVENTION

This invention relates in general to color systems for use in printing and, more particularly, to a system for softproofing a color reproduction.

In color printing processes (e.g., offset lithography, letterpress and gravure), it is customary to form three separate images by scanning the original through three different color filters to form three color separations. These three color separations are combined in various ways to produce printing plates or the equivalent thereof, which in turn control the amount of each colorant deposited at each point of the reproduction. A problem common to these processes is that the exact combination of colorants required for the match is not related to measurements which can be made on the original in any simple way. Great skill and experience are usually required on the part of the operator in adjusting the color printing system in order to achieve high quality reproduction of the original.

Even with highly qualified operators, the unpredictable behavior of color inks is such that proofing using actual inks is still a laborious and time-consuming process. For this reason, various softproofing systems have been developed to facilitate the proofing process. Softproofing systems typically include a color viewing device with which an image to be printed can be displayed by means of a color monitor. Extensive image corrections can then be made so that the corrected color image displayed on the color monitor comes as close as possible to the final printing result. In this manner, instead of having to go through the laborious and time-consuming process of proofing using actual inks, it is possible to predict the final printing result by observing the image as displayed on the color monitor. For an example of an apparatus for checking color pictures on a color monitor, please see U.S. Pat. No. 4,691,229 to Colditz et al.

In color monitors, color images are constructed from an array of square or rectangular pixels where each pixel includes fluorescent elements of different colors. In color reproduction systems, the colorants are typically printed in the form of circular dots. In order for the colorants in the form of circular dots to cover an entire area intended to be of a solid or mixed colors, the circular dots must overlap each other at least partially so as to leave no portion of the area not covered by the circular dots of colorants. For this reason, in almost all color reproducing systems, the dots overlap. Another major difference between color monitors and color reproducing systems is that in color monitors, the color of images displayed by color monitor are additive where the light of each color component is summed together whereas for printing systems, the ink mixtures are more nearly subtractive than additive, but the colors of overlapping areas are difficult to predict accurately because of non-ideal behavior of the inks. For this reason, where a circular dot of one colorant overlaps a circular dot of another colorant of a different color, the color of the overlapping area between the two dots may be difficult to predict accurately.

Conventional softproofing systems have not taken the above differences between color monitors and color reproducing systems using ink into account. For this reason, the color images displayed on the color monitor do not always accurately predict the appearance of the same image when printed using ink. It is therefore desirable to provide an improved softproofing system which enables the picture displayed on the color monitor to more accurately predict the final printing result.

SUMMARY OF THE INVENTION

As discussed above, the non-ideal behavior of inks is such that when two dots of different colors overlap, the color of the overlapping area is somewhat hard to predict. The common colorants for use today in printing systems are cyan (C), magenta (M), yellow (Y), and black (K). Where magenta and yellow overlap, the resulting color is some form of red. Similarly, some forms of blue and green are produced by overlapping magenta and cyan and by overlapping yellow and cyan respectively. This invention is based on the observation that, in calibrating the color monitor for softproofing, it is desirable to match not only the four primary ink colors (C, M, Y, K) with colors displayed by the monitor, but also the colors of the overlapping areas (R, G, B) as well as the color white, which corresponds to the color of paper or any other printing medium where there are no colorants at all.

This invention is also based on the observation that, in order for the color image displayed on the color monitor to accurately predict printing results, the effect of partially overlapping dots of different colors should also be taken into account to control the different light emitting elements of the color monitor so as to display an image on the monitor screen that closely resembles the printing result using inks or other colorants.

One aspect of the invention is directed towards a system for softproofing a color reproduction, where the reproduction is to be performed on areas of a medium using a set of at least two reproduction colorants according to a predetermined overlapping pattern, and where the amounts or densities of reproduction colorants to be used in the reproduction are determined by reproduction signals. The system comprises means for reproducing the colorants in areas of a medium so that each colorant is reproduced separately in at least one area and so that two colorants overlap in at least one area. The system includes a display device capable of displaying images of colors corresponding to the colorants, where the color or colors of the images displayed are determined by the values of corresponding appearance signals. The device displays color images so that the color of one or more of the images corresponds to the color of colorants or of overlapping colorants in each reproduced area. The device is capable of being adjusted so that the color of each of the images displayed matches the color of colorant or colorants of its corresponding reproduced area. Included as part of the system is means for storing values of appearance signals corresponding to the color of each of the images matching the color of colorant or colorants of its corresponding reproduced area. The values of appearance signals also correspond to the colorant or colorants of its corresponding matching reproduced area. The storing means also stores the reproduction signals for such colorant or colorants in a lookup table. The system also includes means for transforming the reproduction signals of a color reproduction to be softproofed into corresponding appearance signals according to said overlapping pattern and according to the lookup table, so that the display device displays color images in accordance to said corresponding appearance signals so that the color images displayed resembles the color reproduction.

Another aspect of the invention is directed towards a method for softproofing the color reproduction employing the above-described system. The method comprises reproducing the colorants in areas of a medium so that each colorant is reproduced separately in at least one area and so that two colorants overlap in at least one area, and displaying color images on the display device so that the color of one of said images corresponds to the color of colorant or of overlapping colorants in each reproduced area, and adjusting the display device until the color of each of the images matches the color of colorant or colorants of its corresponding reproduced area. The method further comprises determining values of appearance signals corresponding to the color of each of the images matching the color of colorant or colorants of its corresponding reproduced area, said values of appearance signals determined also corresponding to the colorant or colorants of its corresponding matching reproduced area. The method includes storing the values of appearance signals corresponding to the colorant or colorants of its corresponding matching reproduced area and the reproduction signals for such colorant or colorants in a lookup table. The method further includes transforming the reproduction signals of a color reproduction to be softproofed into corresponding appearance signals according to said overlapping pattern in a lookup table and displaying color images on the display device in accordance to said corresponding appearance signals so that the color images displayed resembles said color reproduction.

Another aspect of the invention is directed towards an apparatus for use in a system for softproofing a color reproduction, the reproduction to be performed on areas of a medium using a set of at least two reproduction colorants according to a predetermined overlapping pattern, where amounts or densities of the reproduction colorants to be used in the reproduction are determined by reproduction signals. The system includes means for reproducing the colorants in areas of a medium so that each colorant is reproduced separately in at least one area and so that two colorants overlapping at least one area, and a display device capable of displaying images of colors corresponding to the colorants. The color or colors of the images displayed are determined by the values of corresponding appearance signals. The device displays color images so that color of one of the images corresponds to the color of colorant or overlapping colorants in each reproduced area. The device is capable of being adjusted so that the color of each of the images matches the color of colorant or colorants of its corresponding reproduced area. The apparatus comprises means for storing values of appearance signals corresponding to the color of each of said images matching the color of colorant or colorants of its corresponding reproduced area. The values of appearance signals also correspond to the colorant or colorants of its corresponding matching reproduced area. Said storing means also stores the reproduction signals for such colorant or colorants in a lookup table. The apparatus further includes means for transforming the reproduction signals of a color reproduction to be softproofed into corresponding appearance signals according to said overlapping pattern in the lookup table, so that when the display device displays color images in accordance to said corresponding appearance signals, said color images will resemble the color reproduction in said medium.

DETAILED DESCRIPTION OF THE PREFERRED EMBODIMENT

Figure 1:
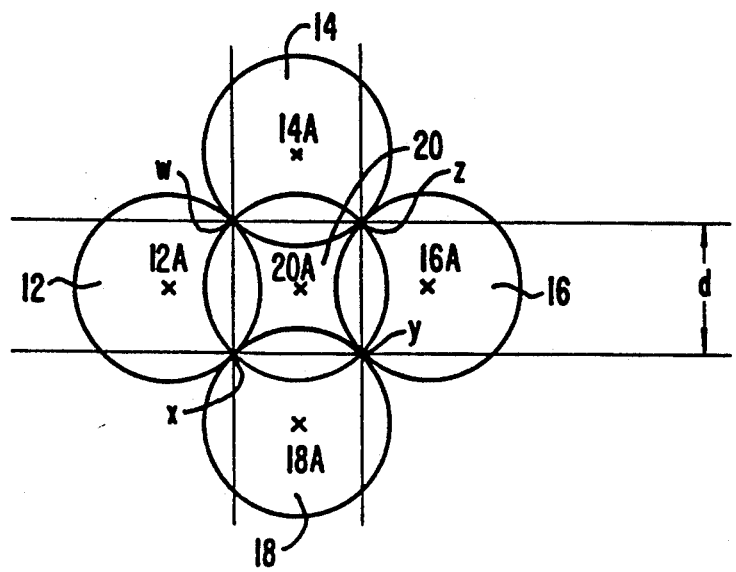
FIG. 1 is a schematic view of five overlapping circular dots to illustrate an overlapping pattern of dots printed by a color reproducing system.

FIG. 1 is a schematic view of five dots printed by a printer in a rectangular grid to illustrate the invention. As shown in FIG. 1, the five dots 12, 14, 16, 18, 20 are centered at 12A, 14A, 16A, 18A, and 20A, where the centers are part of the rectangular grid pattern of the printer. As shown in FIG. 1, the center dot 20 overlaps all of the remaining four dots at the four sides of square wxyz and adjacent ones of dots 12, 14, 16, 18 touch each other at the intersection point with dot 20.

Assuming that the square grid pattern of the printer has spacing d, then each side of the square wxyz is d in length, and the diameter of the dots 12–20 must each be at least d multiplied by square root of 2 so that the dots printed by the printer would cover the entire surface of an area in the medium to be printed. This is illustrated in FIG. 1, where in order to cover the square wxyz, the outside boundary of dot 20 must pass through the four corners of square wxyz. If dot 20 is any smaller, then the four corners wxyz would not be covered by any of the five dots 12–20 centered at 12A–20A. Of course, the dots 12–20 may be larger than as shown in FIG. 1 and still cover the entire area of any medium to be printed.

As discussed above, the non-ideal behavior of colorants such as inks are such that when inks of different colors overlap, the color of the overlapping area may be difficult to predict accurately. The overlapping can occur between adjacent dots, such as dots 12 and 20 or overlapping can occur in the same dot, such as when cyan and magenta inks are printed sequentially on dot 20. Present softproofing systems do not match overlapping colorants to the color of the monitor. One aspect of the invention is directed to the observation that, if the color monitor is adjusted so that its color matches not only the non-overlapping colorants themselves but also the colors of the overlapping colorants, the color images reproduced by the color monitor in softproofing will more accurately predict the actual printing results. A system for accomplishing such adjustments is illustrated in FIG. 2.

Figure 2:
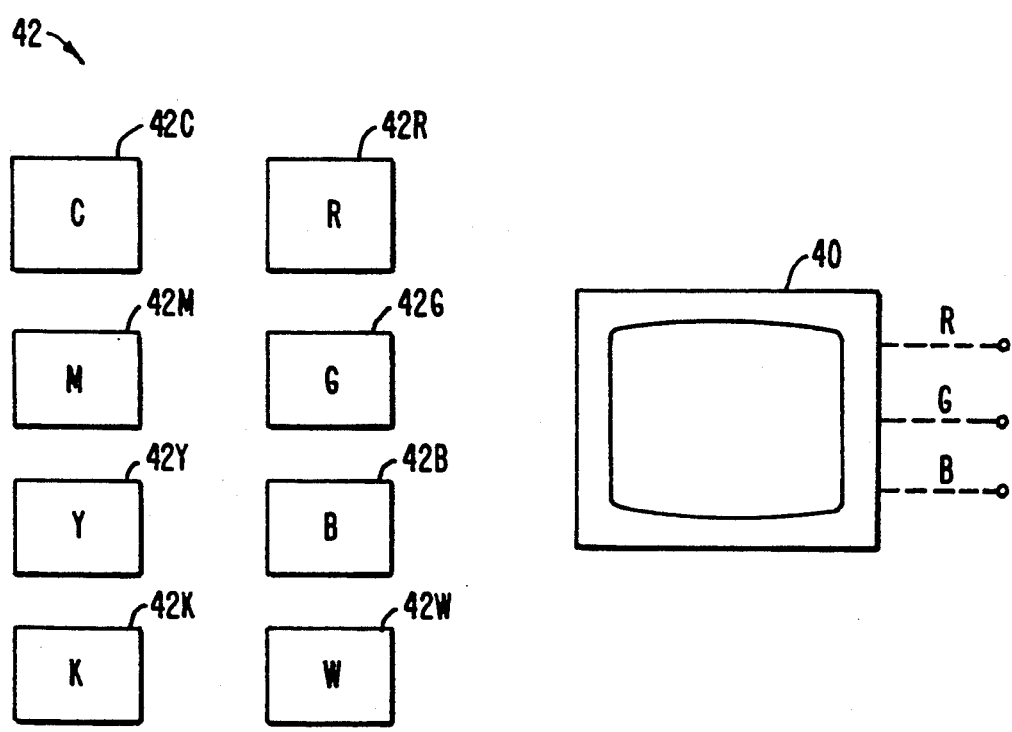
FIG. 2 is a schematic view of a color monitor and eight different colors C, Y, M, K, R, G, B, W, as reproduced on a medium such as paper for calibration of the color monitor.

FIG. 2 is a schematic view of a color monitor 40 and eight color patches 42 to illustrate the invention. Thus, color patch 42C is obtained by printing, in an overlapping pattern such as that shown in FIG. 1, an area of a medium such as paper with cyan color ink. The color patches 42M, 42Y, and 42K are printed respectively using magenta, yellow and black inks. Color patch 42R, however, is printed by using magenta and yellow ink where the magenta dots would completely overlap all of the yellow dots. Color patch 42G would then be made by completely overlapping cyan and yellow dots and color patch 42B would be made by completely overlapping cyan and magenta dots. Color patch 42W is obtained by not printing any colorant in any area of the medium.

Color monitor 40 is then caused to display a color that corresponds to one of the eight color patches. As known to those skilled in the art, colorants such as inks exhibit a particular color component by absorbing most of the other color components. However, the nature of the inks are such that it would not entirely absorb all of the other components so that some other color components would be reflected. Thus, for example, cyan colored ink would also reflect a small amount of magenta and yellow light. This is quite different from color monitor 40 where the color emitting elements, such as phosphor, can be made to emit any intensity of red, green and blue light. The light of the three primary colors red (R), green (G) and blue (B) are known more generally as tristimulus values which are defined as the amount of three primary colored lights which, when added, produce a visual or "colorimetric" match with an original color. Appearance signals are defined as values produced by any reversible transformation of RGB. Luminance/chromanance (LC1C2) and luminance, hue and saturation (LHS) are two common sets. Color monitor 40 displays images according to appearance values. For simplicity, the appearance values for controlling the display of color images of color monitor 40 may also be called RGB intensity values.

For the reasons described above, the color patch 42R may reflect not only red light but also green and blue light to some extent. For this reason, for a color displayed by the color monitor 40 to completely match the color of patch 42R, the values of appearance signals G, B are typically non-zero. Thus, monitor 40 is adjusted until the color displayed on its screen matches visually to an operator or by means of a colorimeter to one of the eight patches, such as patch 42R. When this happens, the values of the appearance signals R, G, B are then read from monitor 40 or the colorimeter and recorded. The same procedure is repeated for matching the color of the screen in color monitor 40 to each of the remaining seven color patches and records of eight sets of values of RGB are then obtained. These sets of RGB intensity values are then stored in a lookup table in a storage device described below in reference to FIG. 4. At this point, color monitor 40 has been calibrated with respect to the four colorants that are used to produce eight color patches 42.

Figure 3:
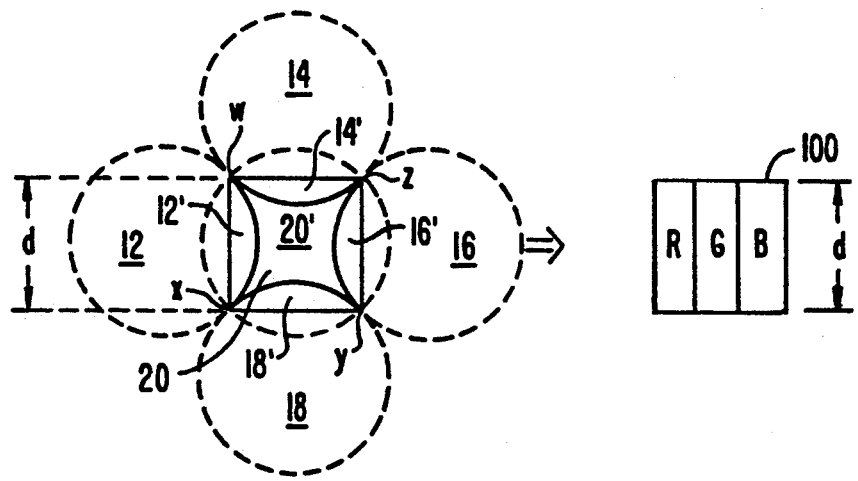
FIG. 3 is a schematic view illustrating the color transformation performed in accordance with this invention for rendering a more accurate softproof.

As indicated above, conventional softproofing systems do not account for the effect of dot overlap. FIG. 3 is a schematic view illustrating color conversion of a square area in a medium with overlapping colorant dots to a pixel in a monitor to illustrate the invention. While only square areas and pixels are illustrated in the figures, it will be understood that rectangular areas and pixels can be used as well and are within the scope of the invention. For simplicity in discussion, identical components are identified by the same numerals or symbols in this application.

As shown in FIG. 3, a square area wxyz contains portions 12', 14', 16', 18' and 20' of five dots 12, 14, 16, 18 and 20. In order to more accurately represent on the screen in color monitor 40 the color of the colorants in portions 12'-20' in square wxyz, all five portions are taken into account in arriving at the values of appearance signals RGB for the corresponding pixel 100 on the color monitor screen. Thus, if the colors 20', 12', 14', 16', 18' are $C_1$, $C_2$, $C_3$, $C_4$, $C_5$ respectively, and each side of the square wxyz is of length d, then the color within the square wxyz is given by:

$$C_d = \frac{a_1 C_1 + a_2 C_2 + a_3 C_3 + a_4 C_4 + a_5 C_5}{d^2}$$

where coefficient $a_1$ of contribution $a_1 C_1$ of the dot 20 with its center at the center of the pixel is given by:

$$a_1 = d^2(4-\pi)/2$$

and coefficients $a_2$, $a_3$, $a_4$, $a_5$ of the contributions $a_2 C_2$, $a_3 C_3$, $a_4 C_4$, $a_5 C_5$ of the four dots 12, 14, 16, 18, that each overlaps one side area of the square wxyz are given by:

$$a_2 = a_3 = a_4 = a_5 = d^2/8(\pi-2)$$

The color $C_1$ must be one of the eight colors in the eight color patches 42 where such color has corresponding values of appearance signals RGB in the lookup table obtained in a manner described above in reference to FIG. 2. Similarly, the colors $C_2$, $C_3$, $C_4$, $C_5$ are also the values of appearance signals RGB obtained from the lookup table compiled as described above in reference to FIG. 2. Therefore, from the equations above and the lookup table, one would then obtain the combined values of the appearance signals for controlling the color of the pixel 100 on the screen of monitor 40. Since each of the five colors in the square area wxyz has been matched with colors on the monitor screen, the combined appearance values $C_d$ would then match the color of the square area wxyz in the printed medium. Therefore, the user of the system can be assured that, when a color reproduction is softproofed using the calibrated monitor 40, the color image displayed on the screen of the monitor will resemble the picture when it is actually printed in ink using a printer.

Figure 4:
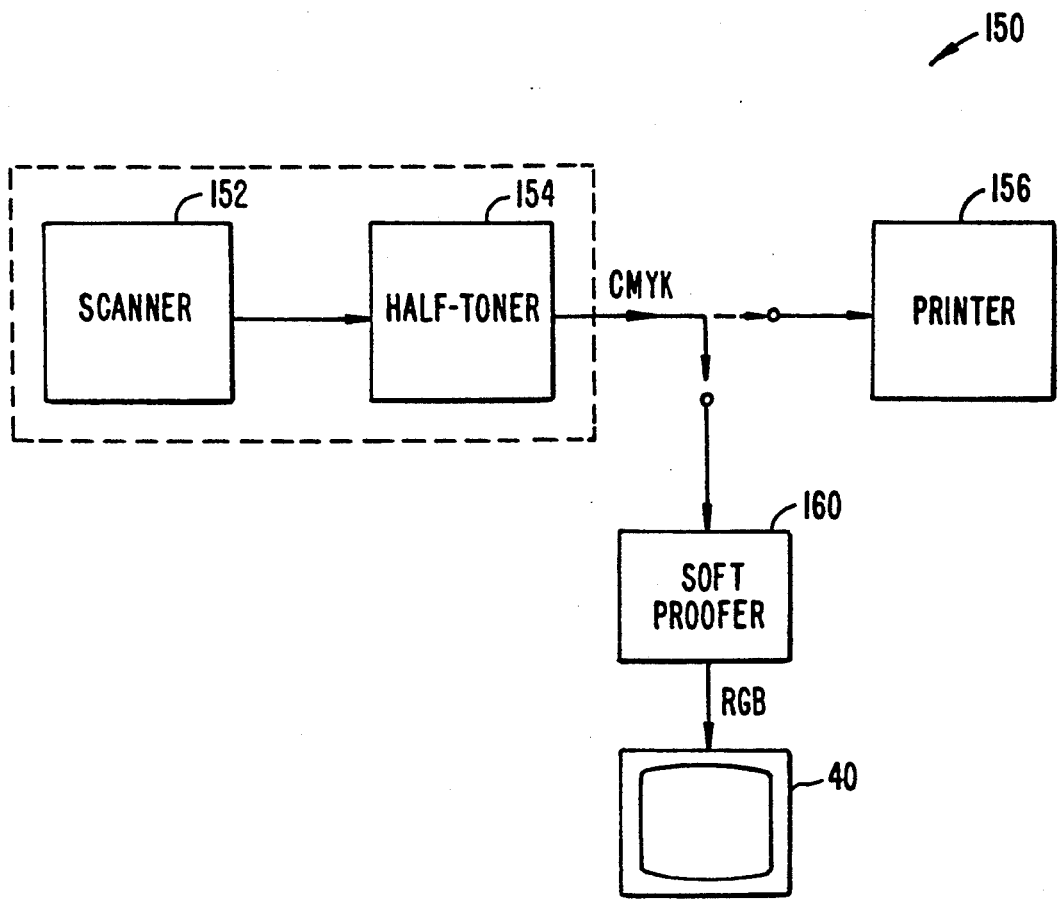
FIG. 4 is a block diagram of a system for color reproduction and softproofing to illustrate the invention.

FIG. 4 is a block diagram of the system to illustrate the invention. As shown in FIG. 4, system 150 includes a scanner 152 for scanning a color original and a halftoner 154 for performing a halftoning algorithm on the scanned image to provide signals indicating the densities of colorants CMYK that are normally used by the printer 156 in printing a halftone rendition of the original. As discussed above, proofing using actual inks and printer 156 is laborious and time-consuming. It is therefore desirable to perform softproofing using color monitor 40. This is achieved using softproofer 160. Softproofer 160 has therein a memory that stores the lookup table obtained in the reproducing and matching procedure described above in reference to FIG. 2. Softproofer 60 than fetches the corresponding values of the appearance signals for the reproduction signals from halftoner 154 from the lookup table and converts them in a manner described above in reference to FIG. 3 into the combined or added values of appearance signal values RGB for each pixel 100 on the monitor 40. In this manner, the color image appearing on the screen on monitor 40 will closely resemble the color image when actually printed by printer 156 using actual inks.

In the above description, it is assumed that printer 156 prints circular dots of minimum size along a square grid pattern in the manner illustrated in FIGS. 1 and 3. It will be understood, however, that the overlapping pattern of the printer may be different from that shown in FIGS. 1 and 3, such as where the circular dots overlap the larger percentage of neighboring dots in a rectangular array; all such configurations are within the scope of the invention. The above-described softproofing system will function as above for accurate softproofing if the printer 156 prints in essentially the same overlap pattern in accordance to which softproofer 160 computes the combined values of appearance signals for display on monitor 40. In other words, if the circular dots printed by printer 150 overlap adjacent dots in larger percentage areas, another overlapping pattern similar to FIGS. 1 and 3 should be drawn to derive, based on the simple geometry of the overlap, the formula for combining the colors of the different areas of different colors within the square (or rectangular or other geometrical shapes) wxyz so that the color within such square can be faithfully duplicated in pixel 100.

It is known that the characteristics of colorants and of printing mediums such as paper may shift over time. In such event, it is desirable to periodically and at selected times recalibrate monitor 40 in a manner described above in reference to FIG. 2 to update the lookup table in softproofer 160.

Instead of simply scanning a color original and then performing a halftoning operation to obtain the reproduction signals CMYK, it is also possible for the reproduction signals to originate simply from the image memory after various processing has been performed thereon, such as various aesthetic corrections made intentionally. For this reason, blocks 152 and 154 may be simply replaced by a box 162 shown in dotted lines representing such aesthetic correction systems or an image memory. After a user is satisfied with the result of reproduction using softproofing, a switch 180 may be operated to connect the box 162 to printer 156 to obtain an actual print using ink.

While the invention has been described above by reference to the preferred embodiments, it will be understood that various modifications may be made without departing from the scope of the invention which is to be limited only by the appended claims.

What is claimed is:

1. A method for soft proofing a color reproduction, said reproduction to be performed on areas of a medium using a set of at least two reproduction colorants according to a predetermined overlapping pattern, wherein amounts of the reproduction colorants to be used in the reproduction are determined by reproduction signals, said method using a display device capable of displaying images of colors corresponding to the colorants, wherein the color or colors of said images displayed are determined by the values of corresponding appearance signals, said method comprising:

reproducing said colorants in areas of a medium so that each colorant is reproduced separately in at least one area, and so that two colorants overlap in at least one area;

displaying color images on the display device so that the color of one of said images corresponds to the color of colorant or of overlapping colorants in each reproduced area;

adjusting said display device until the color of each of said images matches the color of colorant or colorants of its corresponding reproduced area;

determining values of appearance signals corresponding to the color of each of said images matching the color of colorant or colorants of its corresponding reproduced area, said values of appearance signals determined also corresponding to the colorant or colorants of its corresponding matching reproduced area;

storing the values of appearance signals corresponding to the colorant or colorants of its corresponding matching reproduced area and the reproduction signals for such colorant or colorants in a lookup table;

transforming the reproduction signals of a color reproduction to be softproofed into corresponding appearance signals according to said overlapping pattern and the lookup table; and displaying color images on the display device in accordance to said corresponding appearance signals, so that said color images will resemble said color reproduction in said medium.

2. The method of claim wherein said reproducing step reproduces cyan, yellow, magenta and black colorants in four separate areas as well as in at least three separate overlapping areas to form blue, red and green colors respectively in said three overlapping areas, leaving at least one area without any colorant.

3. The method of claim 2, wherein said displaying step causes the display device to display at least eight images of respective red, blue, green, cyan, magenta, yellow, black and white colors, and wherein said adjusting step adjusts the display device until the color of each of eight color images displayed matches the color of each of the corresponding seven areas and the area without any colorant.

4. The method of claim wherein the reproducing step reproduces colorants in substantially circular dots that overlap one another to cover entire areas of said medium.

5. The method of claim 4, wherein said dots have centers and substantially the same diameter and are positioned with their centers arranged in a two dimensional array of spacing d, and wherein the predetermined pattern is such that the diameter of the dots is substantially equal to square root of 2 times the distance d between the centers of adjacent dots.

6. The method of claim 5, said display device displaying images according to appearance signals for pixels that are d by d squares, wherein said transforming step includes the step of looking up from the lookup table the values of appearance signals corresponding to the reproduction signals for reproducing colorant or colorants in each pixel area for the color reproduction to be softproofed, and wherein said transforming step is such that, for each square pixel of the display device, the appearance signal determining the color $C_d$ of such pixel is given by:

$$C_d = \frac{a_1 C_1 + a_2 C_2 + a_3 C_3 + a_4 C_4 + a_5 C_5}{d^2}$$

where coefficient a of contribution $a_1 C_1$ of the dot with its center at the center of the pixel is given by:

$$a_1 = d^2(4-\pi)/2$$

and coefficients $a_2$, $a_3$, $a_4$, $a_5$ of the contributions $a_2 C_2$, $a_3 C_3$, $a_4 C_4$, $a_5 C_5$ of the four dots that each overlaps one side area of said pixel are given by:

$$a_2 = a_3 = a_4 = a_5 = d^2/8(\pi-2)$$

and where $C_1$ is the appearance signal obtained in the looking up step corresponding to reproducing signals for color of the colorant of the dot with its center at the center of the pixel, and $C_2$, $C_3$, $C_4$, $C_5$ are the appearance signals obtained in the looking up step corresponding to reproducing signals for color of the colorant of the the colors of the colorants of the dots overlapping one side of the pixel.

7. The method of claim 1, wherein the adjusting step adjusts the display device until the color of each of said images visually matches the color of colorant or overlapping colorants of its corresponding reproduced area.

8. The method of claim 1, wherein the adjusting step employs a colorimeter that provides readings for comparing the colors of the displayed images to the colors of the colorants in the reproduced areas, and adjusts the display device until, according to readings of the colorimeter, the color of each of said images is the same as the color of colorant or overlapping colorants of its corresponding reproduced area.

9. The method of claim 1, said color reproduction being performed using a printing system on areas of a medium, said method further comprising:
measuring the colorimetric values of the colors of the non-overlapping and overlapping reproduced colorants in areas of the medium;
compiling a look up table of said colorimetric values for comparison with colors reproduced by the system at different times, or using different colorants or medium.

10. The method of claim 1, said reproducing, displaying, adjusting, determining and storing steps collectively defining a calibrating step, said method further comprising repeating said calibrating step at selected times so that the color images displayed by the display device according to appearance signals corresponding to reproduction signals of a color reproduction will resemble the color reproduction despite changes in the medium or the colorants.

11. A system for soft proofing a color reproduction, said reproduction to be performed on areas of a medium using a set of at least two reproduction colorants according to a predetermined overlapping pattern, wherein amounts of the reproduction colorants to be used in the reproduction are determined by reproduction signals, said system comprising:
means for reproducing said colorants in areas of a medium so that each colorant is reproduced separately in at least one area, and so that two colorants overlap in at least one area;
a display device capable of displaying images of colors corresponding to the colorants, wherein the color or colors of said images displayed are determined by the values of corresponding appearance signals, said device displaying color images so that the color of one of said images corresponds to the color of colorant or of overlapping colorants in each reproduced area, said device capable of being adjusted so that the color of each of said images matches the color of colorant or colorants of its corresponding reproduced area;
means for storing values of appearance signals corresponding to the color of each of said images matching the color of colorant or colorants of its corresponding reproduced area, said values of appearance signals also corresponding to the colorant or colorants of its corresponding matching reproduced area, and for storing the reproduction signals for such colorant or colorants in a lookup table; and
means for transforming the reproduction signals of a color reproduction to be softproofed into corresponding appearance signals according to said overlapping pattern and the lookup table, so that when the display device is caused to displays color images in accordance to said corresponding appearance signals, said color images displayed will resemble said color reproduction in said medium.

12. The system of claim 11, wherein the display device displays images in a display medium such that the color in any part of said medium does not substantially overlap the color in any other part of said medium, and said transforming means transforms the reproduction signals of a color reproduction to be softproofed into corresponding appearance signals according to said overlapping pattern and the fact that colors in said display medium do not overlap.

13. The system of claim 12, wherein said device is a television.

14. The system of claim 11, wherein the reproducing means is such that colorants are reproduced in substantially circular dots that overlap one another to cover entire areas of said reproduction medium.

15. The system of claim 14, wherein said dots have centers and substantially the same diameter and are positioned with their centers arranged in a two dimensional array of spacing d, and wherein the predetermined pattern is such that the diameter of the dots is substantially equal to square root of 2 times the distance d between the centers of adjacent dots.

16. The system of claim 15, said display device displaying images according to appearance signals for pixels that are d by d squares, wherein said transforming means includes means for fetching from the lookup table the values of appearance signals corresponding to the reproduction signals for reproducing colorant or colorants in each pixel area for the color reproduction to be softproofed, and wherein said transforming means is such that, for each square pixel of the display device, the appearance signal determining the color $C_d$ of such pixel is given by:

$$C_d = \frac{a_1C_1 + a_2C_2 + a_3C_3 + a_4C_4 + a_5C_5}{d^2}$$

where coefficient $a_1$ of contribution $a_1C_1$ of the dot with its center at the center of the pixel is given by:

$$a_1 = d^2(4-\pi)/2$$

and coefficients $a_2$, $a_3$, $a_4$, $a_5$ of the contributions $a_2C_2$, $a_3C_3$, $a_4C_4$, $a_5C_5$ of the four dots that each overlaps one side area of said pixel are given by:

$$a_2 = a_3 = a_4 = a_5 = d^2/8(\pi-2)$$

and where $C_1$ is the appearance signal obtained in the looking up step corresponding to reproducing signals for color of the colorant of the dot with its center at the center of the pixel, and $C_2$, $C_3$, $C_4$, $C_5$ are the appearance signals obtained in the looking up step corresponding to reproducing signals for color of the colorant of the the colors of the colorants of the dots overlapping one side of the pixel.

17. The system of claim 11, further comprising a colorimeter that provides readings for comparing the colors of the displayed images to the colors of the colorants in the reproduced areas.

18. An apparatus for use in a system for soft proofing a color reproduction, said reproduction to be performed on areas of a medium using a set of at least two reproduction colorants according to a predetermined overlapping pattern, wherein amounts of the reproduction colorants to be used in the reproduction are determined by reproduction signals, said system including (a) means for reproducing said colorants in areas of a medium so that each colorant is reproduced separately in at least one area, and so that two colorants overlap in at least one area; and (b) a display device capable of displaying images of colors corresponding to the colorants, wherein the color or colors of said images displayed are determined by the values of corresponding appearance signals, said device displaying color images so that the color of one of said images corresponds to the color of colorant or of overlapping colorants in each reproduced area, said device capable of being adjusted so that the color of each of said images matches the color of colorant or colorants of its corresponding reproduced area; said apparatus comprising:

means for storing values of appearance signals corresponding to the color of each of said images matching the color of colorant or colorants of its corresponding reproduced area, said values of appearance signals also corresponding to the colorant or colorants of its corresponding matching reproduced area, and for storing the reproduction signals for such colorant or colorants in a lookup table; and means for transforming the reproduction signals of a color reproduction to be softproofed into corresponding appearance signals according to said overlapping pattern and the lookup table, so that when the display device displays color images in accordance to said corresponding appearance signals, said color images will resemble said color reproduction in said medium.

19. The apparatus of claim 18, wherein the reproducing means is such that colorants are reproduced in substantially circular dots that overlap one another to cover entire areas of said reproduction medium, wherein said dots have centers and substantially the same diameter and are positioned with their centers arranged in a two dimensional array of spacing d, and wherein the predetermined pattern is such that the diameter of the dots is substantially equal to square root of 2 times the distance d between the centers of adjacent dots, said display device displaying images according to appearance signals for pixels that are d by d squares, wherein said transforming means includes means for fetching from the lookup table the values of appearance signals corresponding to the reproduction signals for reproducing colorant or colorants in each pixel area for the color reproduction to be softproofed, and wherein said transforming means is such that, for each square pixel of the display device, the appearance signal determining the color $C_d$ of such pixel is given by:

$$C_d = \frac{a_1 C_1 + a_2 C_2 + a_3 C_3 + a_4 C_4 + a_5 C_5}{d^2}$$

where coefficient $a_1$ of contribution $a_1 C_1$ of the dot with its center at the center of the pixel is given by:

$$a_1 = d^2 (4-\pi)/2$$

and coefficients $a_2$, $a_3$, $a_4$, $a_5$ of the contributions $a_2 C_2$, $a_3 C_3$, $a_4 C_4$, $a_5 C_5$ of the four dots that each overlaps one side area of said pixel are given by:

$$a_2 = a_3 = a_4 = a_5 = d^2/8(\pi-2)$$

and where $C_1$ is the appearance signal obtained in the looking up step corresponding to reproducing signals for color of the colorant of the dot with its center at the center of the pixel, and $C_2$, $C_3$, $C_4$, $C_5$ are the appearance signals obtained in the looking up step corresponding to reproducing signals for color of the colorant of the the colors of the colorants of the dots overlapping one side of the pixel.

* * * * *

UNITED STATES PATENT AND TRADEMARK OFFICE
CERTIFICATE OF CORRECTION

PATENT NO. : 5,296,947
DATED : March 22, 1994
INVENTOR(S) : Harry Bowers

It is certified that error appears in the above-indentified patent and that said Letters Patent is hereby corrected as shown below:

Column 8, line 17, Claim 2: Replace
"The method of claim wherein" with
--The method of claim 1, wherein--

Column 8, line 32, Claim 4: Replace
"The method of claim wherein" with
--The method of claim 1, wherein--

Column 8, line 58, Claim 6: Replace "coefficient a" with
--coefficient $a_1$--

Column 10, line 7, Claim 11: Replace "is caused to displays"
with --is caused to display--

Column 10, lines 64-65, Claim 16: Replace "reproducing signals for color of the colorant of the the colors of the colorants of the dots overlapping"
with
--reproducing signals for colors of the colorants of the dots each overlapping--

UNITED STATES PATENT AND TRADEMARK OFFICE
CERTIFICATE OF CORRECTION

PATENT NO. : 5,296,947
DATED : March 22, 1994
INVENTOR(S) : Harry Bowers

It is certified that error appears in the above-indentified patent and that said Letters Patent is hereby corrected as shown below:

Column 12, lines 39-40, Claim 19:

Replace "reproducing signals for color of the colorant of the the colors of the colorants of the dots overlapping" with
--reproducing signals for colors of the colorants of the dots each overlapping--

Column 9, lines 6-7, Claim 6:

Replace "reproducing signals for color of the colorant of the colors of the colorants of the dots overlapping" with
—reproducing signals for colors of the colorants of the dots each overlapping—.

Signed and Sealed this

Seventeenth Day of January, 1995

Attest:

BRUCE LEHMAN

Attesting Officer

Commissioner of Patents and Trademarks